(12) United States Patent
Zhamu et al.

(10) Patent No.: US 7,999,027 B2
(45) Date of Patent: Aug. 16, 2011

(54) PRISTINE NANO GRAPHENE-MODIFIED TIRES

(75) Inventors: Aruna Zhamu, Centerville, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 12/583,375

(22) Filed: Aug. 20, 2009

(65) Prior Publication Data

US 2011/0046289 A1 Feb. 24, 2011

(51) Int. Cl.
*C08K 3/04* (2006.01)

(52) U.S. Cl. ........................ 524/495; 524/496

(58) Field of Classification Search .............. 524/495
See application file for complete search history.

(56) References Cited

U.S. PATENT DOCUMENTS

| | | | |
|---|---|---|---|
| 2,798,878 A | 7/1957 | Hummers | |
| 6,395,199 B1 * | 5/2002 | Krassowski et al. | 427/470 |
| 6,927,250 B2 | 8/2005 | Kaschak et al. | |
| 7,071,258 B1 | 7/2006 | Jang et al. | |
| 2004/0033189 A1 | 2/2004 | Kaschak et al. | |
| 2007/0092432 A1 | 4/2007 | Prud'Homme et al. | |
| 2009/0054581 A1 * | 2/2009 | Prud'Homme et al. | 524/495 |
| 2010/0000441 A1 * | 1/2010 | Jang et al. | 106/31.13 |
| 2010/0147188 A1 * | 6/2010 | Mamak et al. | 106/31.13 |

OTHER PUBLICATIONS

U.S. Appl. No. 11/800,728, filed May 8, 2007, A. Zhamu, et al.
C. Lee, et al., "Measurement of the Elastic Properties and Intrinsic Strength of Monolayer Graphene," Science, 321 (Jul. 2008) 385-388.
A. Balandin, et al. "Superior Thermal Conductivity of Single-Layer Graphene," Nano Lett., 8 (3) (2008) 902-907.
Bor Z. Jang and A Zhamu, "Processing of Nano Graphene Platelets (NGPs) and NGP Nanocomposites: A Review," J. Materials Sci. 43 (2008) 5092-5101.

* cited by examiner

*Primary Examiner* — Ling-Siu Choi
*Assistant Examiner* — Hui Chin (57) ABSTRACT

A tire or tire lining comprising a rubber composite, comprising at least one rubber or elastomer matrix and pristine nano graphene platelets dispersed in the matrix. The pristine nano graphene-modified tire or tire lining has a significantly enhanced thermal conductivity.

14 Claims, 5 Drawing Sheets

PRISTINE NANO GRAPHENE-MODIFIED TIRES

The present invention is a result of a research and development project sponsored by the US National Science Foundation Small Business Technology Transfer (STTR) Program.

FIELD OF THE INVENTION

The present invention relates generally to the field of vehicle tire compositions. In particular, the invention provides a tire rubber composition modified by nano graphene platelets (NGPs), also known as graphene nano sheets or graphene nano ribbons. The NGPs include pristine graphene that is substantially free from oxygen, as well as the oxidized graphene, also known as graphite oxide nano platelets.

BACKGROUND OF THE INVENTION

Tires for all types of ground vehicles typically comprise a rubber composite, which is composed of a rubbery or elastomeric matrix with additives dispersed therein. Additives are needed to impart various desirable properties to a tire, including abrasion resistance (to reduce wear and tear), strength, stiffness, thermal conductivity (to dissipate heat effectively and efficiently), rolling resistance or wet grip, and chemical resistance. The use of an additive to enhance wear resistance must not in any way adversely impact on rolling resistance or wet grip. The words "rubber" and "elastomer" are hereinafter used interchangeably.

Rubbers or elastomers generally have a low thermal conductivity. Consequently, when the rubber generates heat through repetitive deformation, they store the generated heat that in turn raises the temperature of rubber itself, thereby promoting heat deterioration of the rubber. In an automotive tire that is subjected to repetitive deformation when the automobile is in motion, the generated heat must be rapidly released or dissipated. To achieve this goal, the heat conduction capability of a rubber may be improved by compounding a rubber with a filler having a heat conductivity higher than that of the rubber. However, in order to obtain a satisfactory effect, an excessive amount of thermally conductive additives is usually required and, as a result, the dispersion of the filler becomes non-uniform and dynamic properties are lowered. Furthermore, highest thermal conductivity materials are either too heavy (e.g. copper) or too expensive (e.g., carbon nanotubes). Metallic fillers are also corrosion-prone.

Carbon nanotubes (CNTs) do exhibit impressive strength, stiffness, and thermal conductivity and could be a good candidate additive for rubbers. However, attempts to produce CNTs in large quantities have been fraught with overwhelming challenges due to poor yield and costly fabrication and purification processes. Hence, even the moderately priced multi-walled CNTs remain too expensive to be used in high-volume applications or commodity products, such as structural polymer composites and tires. Further, for many applications, homogeneous dispersion of CNTs in a polymer and processing of polymer fluids containing a high CNT concentration have been difficult due to the tendency for CNTs to aggregate or physically entangle with one another and the chemical inertness of CNT surfaces.

Instead of trying to develop lower-cost processes for CNTs, the applicants sought to develop an alternative nanoscale carbon material with comparable properties that can be produced much more cost-effectively and in larger quantities. This development work led to the discovery of processes and compositions for a new class of nano material now commonly referred to as nano graphene platelets (NGPs), graphene nano sheets, or graphene nano ribbons [e.g., B. Z. Jang and W. C. Huang, "Nano-scaled graphene plates," U.S. Pat. No. 7,071,258, Jul. 4, 2006].

An NGP is a platelet, sheet, or ribbon composed of one or multiple layers of graphene plane, with a thickness that can be as small as 0.34 nm (one carbon atom thick). A single-layer graphene is composed of carbon atoms forming a 2-D hexagonal lattice through strong in-plane covalent bonds. In a multi-layer NGP, several graphene planes are weakly bonded together through van der Waals forces in the thickness-direction. Multi-layer NGPs can have a thickness up to 100 nm, but typically less than 10 nm in the present application. Conceptually, an NGP may be viewed as a flattened sheet of a carbon nano-tube (CNT), with a single-layer graphene corresponding to a single-wall CNT and a multi-layer graphene corresponding to a multi-wall CNT. However, this very difference in geometry also makes electronic structure and related physical and chemical properties very different between NGP and CNT. It is now commonly recognized in the field of nanotechnology that NGP and CNT are two different and distinct classes of materials. Both NGPs and CNTs are also distinct from the conventional graphite nanoparticles.

NGPs are predicted to have a range of unusual physical, chemical, and mechanical properties and several unique properties have been observed. For instance, single-layer graphene (also referred to as single-sheet NGP) was found to exhibit the highest intrinsic strength and highest thermal conductivity of all existing materials, even higher than those of single-walled CNTs [C. Lee, et al., "Measurement of the Elastic Properties and Intrinsic Strength of Monolayer Graphene," Science, 321 (July 2008) 385-388; A. Balandin, et al. "Superior Thermal Conductivity of Single-Layer Graphene," Nano Lett., 8 (3) (2008) 902-907]. Single-sheet NGPs possess twice the specific surface areas compared with single-walled CNTs. The thermal conductivity of single-layer graphene, as high as 5,300 W/mk, is two times higher than the highest thermal conductivity of single-walled CNTs ever reported based on actual experimental measurements. Such a high thermal conductivity could translate into a great heat-dissipating capacity if NGPs are properly dispersed in a lubricant or grease material.

In addition to single-layer graphene, multiple-layer graphene platelets also exhibit unique and useful behaviors. Single-layer and multiple-layer graphene are herein collectively referred to as NGPs. Graphene platelets may be oxidized to various extents during their preparation procedures, resulting in graphite oxide or graphene oxide (GO) platelets. In the present context, NGPs refer to both "pristine graphene" containing essentially no oxygen (<1% by weight of oxygen, and preferably <0.05% by weight) and "GO nano platelets" of various oxygen contents. GO nano platelets produced by thermal exfoliation of heavily oxidized graphite typically have a C/O atomic ratio of <95/5 and more typically of <85/15. The term "slightly oxidized NGPs" refer to NGPs with a C/O ratio >95/5, which can be produced by exposing the pristine NGPs to an oxidizing environment for a controlled period of time. It is helpful to herein describe how NGPs are produced.

Figure 1:
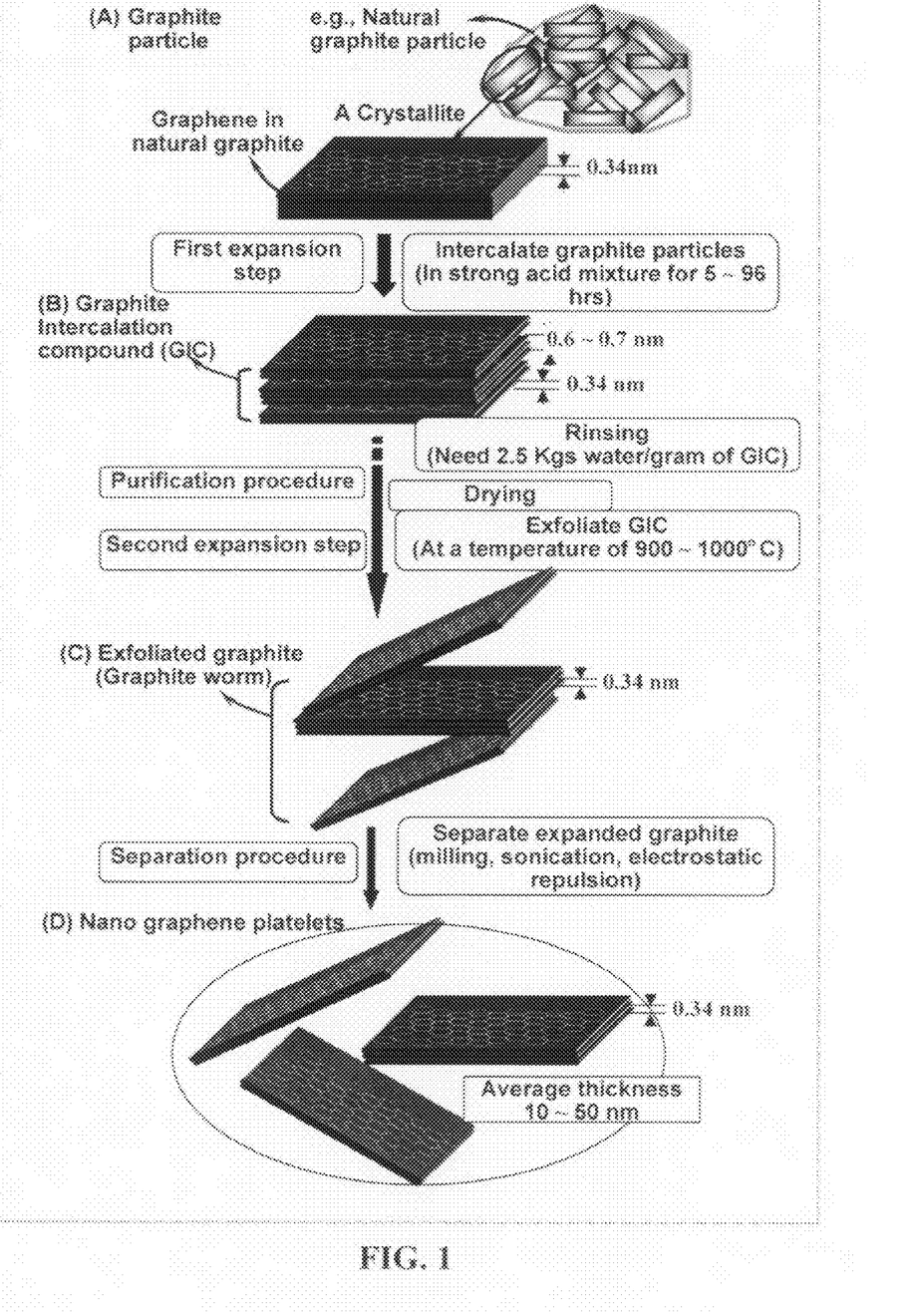
FIG. 1 Schematic of conventional processes for producing oxidized NGPs (also referred to as graphite oxide nano platelets).

The processes that have been used to prepare NGPs were recently reviewed by the applicants [Bor Z. Jang and A Zhamu, "Processing of Nano Graphene Platelets (NGPs) and NGP Nanocomposites: A Review," J. Materials Sci. 43 (2008) 5092-5101]. As illustrated in FIG. 1, the most commonly used process entails treating a natural graphite powder (referred to as Product (A) in FIG. 1) with an intercalant and an oxidant (e.g., concentrated sulfuric acid and nitric acid, respectively) to obtain a graphite intercalation compound (GIC) or, actually, graphite oxide (GO) (referred to as Product (B) in FIG. 1). Prior to intercalation or oxidation, graphite has an inter-graphene plane spacing of approximately 0.335 nm ($L_d = d_{002} = 0.335$ nm or 3.35 Å, based on X-ray diffraction data readily available in open literature).

There is a misconception in the scientific community that van der Waals forces are weak forces, which needs some qualifications. It is well-known that van der Waals forces are short range forces, but can be extremely strong in magnitude if the separation between two objects (e.g., two atoms or molecules) is very small, say <0.4 nm. However, the magnitude of van der Waals forces drops precipitously when the separation increases even only slightly. Since the inter-graphene plane distance in un-intercalated and un-oxidized graphite crystal is small (<0.34 nm), the inter-graphene bonds (van der Waals forces) are actually very strong.

With an intercalation or oxidation treatment, the inter-graphene spacing is increased to a value typically greater than 0.55-0.65 nm. This is the first expansion stage experienced by the graphite material. The van der Waals forces are now significantly weakened due to the increased spacing. It is important to note that, in most cases, some of the graphene layers in a GIC are intercalated (with inter-graphene spacing increased to 0.55-0.65 nm and van der Waals forces weakened), but other layers could remain un-intercalated or incompletely intercalated (with inter-graphene spacing remaining approximately 0.34 nm and van der Waals forces staying strong).

In the conventional processes, the obtained GIC or GO, dispersed in the intercalant solution, will need to be rinsed for several cycles and then dried to obtain GIC or GO powders. These dried powders, commonly referred to as expandable graphite, are then subjected to further expansion or second expansion (often referred to as exfoliation) typically using a thermal shock exposure approach (at a temperature from 650° C. to 1,100° C.). The acid molecules residing in the inter-graphene spacing are decomposed at such a high temperature, generating volatile gas molecules that could push apart graphene planes.

Unfortunately, typically a significant proportion of the gaseous molecules escape without contributing to exfoliation of graphite flakes. Further, those un-intercalated and incompletely intercalated graphite layers remain intact (still having an inter-graphene spacing of approximately <0.34 nm). Additionally, many of the exfoliated flakes re-stack together by re-forming van der Waals forces if they could not be rapidly separated. These effects during this exfoliation step led to the formation of exfoliated graphite (referred to as Product (C) in FIG. 1), which is commonly referred to as "graphite worm" in the industry.

The exfoliated graphite or graphite worm is characterized by having networks of interconnected (un-separated) flakes which are typically >50 nm thick (often >100 nm thick). These individual flakes are each composed of hundreds of layers with inter-layer spacing of approximately 0.34 nm (not 0.6 nm), as evidenced by the X-ray diffraction data readily available in the open literature. In other words, these flakes, if separated, are individual graphite particles, rather than graphite intercalation compound (GIC) particles. This thermal shock procedure can produce some isolated graphite flakes or graphene sheets, but normally the majority of graphite flakes remain interconnected. Again, the inter-flake distance between two loosely connected flakes or platelets is now increased to from 20 nm to several μm and, hence, the van der Waals forces that hold them together are now very weak, enabling easy separation by mechanical shearing or ultrasonication.

Typically, the exfoliated graphite or graphite worm is then subjected to a flake separation treatment using air milling, mechanical shearing, or ultrasonication in a liquid (e.g., water). Hence, a conventional process basically entails three distinct procedures: first expansion (oxidation or intercalation), further expansion (so called "exfoliation"), and separation. The resulting NGPs are graphene oxide (GO), rather than pristine graphene.

The work reported by Prud'Homme, et al. belongs to this category: R. K. Prud'Homme, et al. "Thermally Exfoliated Graphite Oxide," US Pub. No. 2007/0092432 (Apr. 26, 2007) and "Tire Containing Thermally Exfoliated Graphite Oxide," US Pub. No. 2009/0054581 (Feb. 26, 2009). In these two patent applications, natural graphite particles were heavily oxidized, to the extent that the characteristic inter-graphene plane distance of 0.335 nm associated with natural graphite was no longer observable using X-ray diffraction. The resulting exfoliated graphite platelets were heavily oxidized graphite or graphite oxide, as clearly indicated by the title of the patent applications.

D. M. Kaschak, et al. ["Graphite Intercalation and Exfoliation Process," US Pub. No. 2004/0033189 (Feb. 19, 2004); and "Graphite Composites and Method of Making Such Composites," U.S. Pat. No. 6,927,250, Aug. 9, 2005] proposed a method of modifying graphite by introducing a supercritical fluid into interstices of chemically intercalated or intercalated/oxidized graphite (rather than the original natural graphite). The interstices of intercalated and/or oxidized graphite had been expanded and chemically modified due to the presence of intercalant species (such as sulfuric acid) or oxidation-induced functional groups (such as carboxyl). Kaschak, et al. did not teach about the approach of directly intercalating the un-treated natural flake graphite with a supercritical fluid. The modified graphite as proposed by Kaschak, et al. still required a high temperature exposure step, typically at 700-1,200° C., to exfoliate the intercalated and modified graphite. The products were graphite oxide flakes, not pristine graphene.

Furthermore, Kaschak, et al. did not provide any evidence to show the existence of nano-scaled graphite particles that they claimed they produced with this method. In particular, they claimed that "one advantage of the invention is that the aforementioned methods may be used to manufacture graphite in a form that has a thickness of less than about 10 microns, preferably less than about 1 micron, more preferably less than about 100 nm, even more preferably less than about 10 nm, and most preferably less than about 1 nm." However, they did not fairly suggest the conditions under which graphite particles with a thickness less than 10 nm or 1 nm could be produced. This was truly a broad and aggressive claim and should have been supported by solid experimental evidence; unfortunately, absolutely no evidence whatsoever was presented.

In the conventional processes, the post-exfoliation ultrasonication procedure was meant to break up graphite worms (i.e., to separate those already largely expanded/exfoliated flakes that are only loosely connected). Specifically, it is important to emphasize the fact that, in the prior art processes, ultrasonification is used after intercalation and oxidation of graphite (i.e., after first expansion) and most typically after thermal shock exposure of the resulting GIC or GO (i.e., after second expansion or exfoliation) to aid in breaking up those graphite worms. There are already much larger spacings between flakes after intercalation and/or exfoliation (hence, making it possible to easily separate flakes by ultrasonic waves). This ultrasonication was not perceived to be capable of separating those un-intercalated/un-oxidized layers where the inter-graphene spacing remains <0.34 nm and the van der Waals forces remain strong.

The applicant's research group was the very first in the world to surprisingly observe that, under proper conditions (e.g., with the assistance of a surfactant and using a higher sonic power), ultrasonication is capable of producing ultra-thin, pristine graphene directly from pristine graphite, without having to go through chemical intercalation or oxidation. This invention was reported in a patent application [A. Zhamu, J. Shi, J. Guo, and Bor Z. Jang, "Method of Producing Exfoliated Graphite, Flexible Graphite, and Nano Graphene Plates," U.S. patent Ser. No. 11/800,728 (May 8, 2007)].

Figure 2:
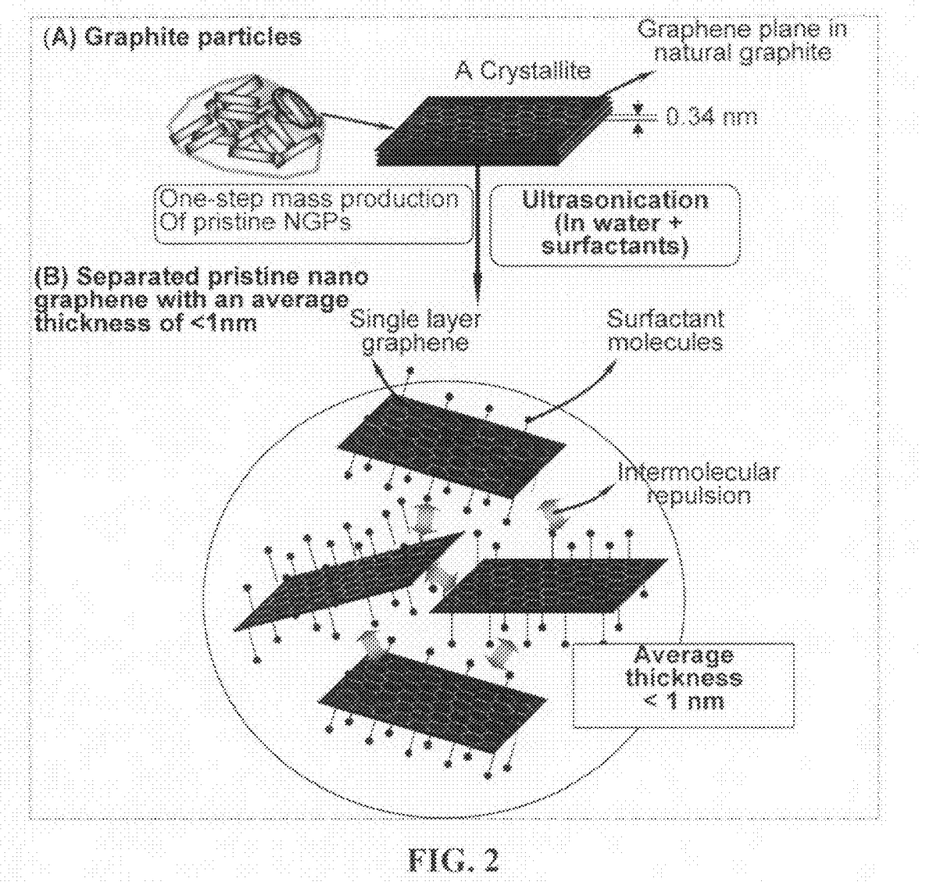
FIG. 2 Schematic of the direct ultrasonication process by which a pristine graphite material, without pre-intercalation or pre-oxidation (without exposing to any undesirable chemical such as sulfuric acid and nitric acid), can be directly exfoliated and separated into ultra-thin pristine NGPs.

Schematically shown in FIG. 2 are the essential procedures used to produce single-layer or few-layer graphene using this direct ultrasonication process. This innovative process involves simply dispersing pristine graphite powder particles in a liquid medium (e.g., water, alcohol, or acetone) containing a dispersing agent or surfactant to obtain a suspension. The suspension is then subjected to an ultrasonication treatment, typically at a temperature between 0° C. and 100° C. for 10-120 minutes. No chemical intercalation or oxidation is required of the starting material prior to ultrasonication. The graphite material has never been exposed to any obnoxious chemical throughout the entire nano graphene production process. This process combines expansion, exfoliation, and separation of pristine graphitic material into one step. Hence, this simple yet elegant method obviates the need to expose graphite to a high-temperature, or chemical oxidizing environment. The resulting NGPs are essentially pristine graphene, which is highly conductive both electrically and thermally.

In the scientific community and in nano materials industry, NGPs are considered a new class of nano materials that is different and distinct from fullerene, carbon nanotubes (CNTs), and graphite nanoparticles for the following main reasons:

(a) Fullerene is considered a zero-dimensional carbon nano material due to its ultra-small sizes in all directions.
(b) CNTs are considered a type of one-dimensional carbon nano material due to their large size in one dimension (length), but small size in other two dimensions (cylindrical cross-section with a diameter <100 nm, more typically <30 nm, and, for single-walled CNTs, <1.0 nm).
(c) Graphite particles (including both micron-scaled and nano-scaled) are considered a three-dimensional carbon material since they have substantially identical or similar sizes in all three directions (X—, Y—, and Z-coordinates). Most of the conventional graphite nanoparticles are close to being spherical or ellipsoidal in shape having a diameter less than 500 nm, but typically >350 nm. Graphite nano particles are produced simply by pulverizing or grinding and then ball-milling natural graphite particles from typically greater than 100 µm to sub-micron in diameter (typically <500 nm, but >>100 nm). In real practice, it is difficult to grind and mill graphite particles down to a size smaller than 350 nm.
(d) NGPs are considered a two-dimensional carbon nano material with large sizes in two dimensions (both length and width typically >0.5 µm, but more typically >1 µm) and ultra-small in one dimension (thickness as small as one carbon atom size).

Due to these differences in geometry, these four classes of carbon materials also exhibit vastly different properties. For instance, the graphite nano particles were normally viewed as excellent thermally conducting materials with a high thermal conductivity of up to 60-80 W/m-k. However, this conductivity value range is almost two orders of magnitude lower than the thermal conductivity of NGPs, just recently found to be as high as 5,300 W/m-k. Thermal conductivity of carbon black, also considered a type of carbon nano particle, is even lower.

In order for NGPs (either pristine graphene or graphene oxide) to be an effective nano-filler for a polymer composite, NGPs must be able to form a stable, uniform dispersion in the polymer matrix. In other words, proper dispersion of NGPs in a polymer would be a prerequisite to achieving good thermal and dynamic (friction and wear) properties of the resulting rubbery composite materials. These issues have not been addressed and the potential of using these highest-performing NGPs as an additive for a tire has not been explored.

It is therefore an object of the present invention to provide a cost-effective tire rubber composition that exhibits superior anti-wear, wet-grip, and thermal conductivity properties.

It is yet another object of the present invention to provide a pristine NGP-containing tire that exhibits improved heat transfer properties as compared to corresponding tires containing graphite oxide nano platelets or graphite nano particles.

Still another object of the present invention is to provide a rubbery tire that exhibits a better combination of friction, wear, and heat transfer properties as compared with a corresponding rubber composition containing silica or carbon black nano particles.

SUMMARY OF THE INVENTION

The present invention provides a tire or tire component (e.g., tire lining) that has a significantly improved thermal conductivity. The tire or tire component comprises a rubber composite, comprising at least one rubber or elastomer matrix with a first thermal conductivity and an effective amount of pristine nano graphene platelets dispersed in the matrix to make the rubber matrix composite thermally conductive, having a thermal conductivity greater than the first thermal conductivity of the matrix.

The thermal conductivity of a neat rubber or elastomer, without any additive, is typically in the range of 0.12-0.2 W/m-K. The pristine nano graphene can have a thermal conductivity as high as 5,300 W/m-K (single-layer graphene) and typically higher than 1,000 W/m-K if the average thickness is lower than 10 nm. By incorporating just a small amount of pristine graphene (e.g., 0.01% by weight of mostly single-layer graphene), one could increase the thermal conductivity of the neat rubber by almost five (5) times. With 50% of pristine graphene, the rubber composite can exhibit a thermal conductivity higher than 500 W/m-K. Thinner NGPs also result in a much higher thermal conductivity for a rubber. These are highly surprising results, which have not been anticipated or observed by any worker in the art of rubbers and tires.

Thus, in one preferred embodiment, the nano graphene platelets have an average thickness less than 10 nm or a specific surface area greater than 90 m$^2$/g. Further preferably, the nano graphene platelets have an average thickness less than 1 nm or a specific surface area greater than 900 m$^2$/g. Most preferably, the pristine graphene platelets comprise a significant proportion of single-layer graphene. The pristine nano graphene platelets can be cost-effectively produced in large quantities by direct ultrasonication discussed earlier (FIG. 2).

The tire rubber composite of the present invention typically has a thermal conductivity much greater than 1 W/m–k, more typically greater than 10 W/m–k and, in many samples, the thermal conductivity is greater than 100 W/m–k. A strikingly high thermal conductivity of >500 W/m–K was observed when approximately 50% by weight of mostly single-layer NGPs was added to natural rubber.

There is really no restriction on the type of rubber or elastomer materials that can be used for practicing the present invention. The rubber or elastomer matrix material can be selected from the group consisting of poly[4,4'-methylenebis (phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis (phenyl isocyanate)-alt-1,4-butanediol/poly(butylene adipate)], poly[4,4'-methylenebis(phenyl isocyanate)-alt-1,4-butanediol/di(propylene glycol)/polycaprolactone], poly [4,4'-methylenebis(phenyl isocyanate)-alt-1,4-butanediol/ polytetrahydrofuran], amine terminated polybutadienes, carboxyl terminated polybutadienes, polybutadiene, dicarboxy terminated butyl rubber, styrene/butadiene copolymers, polyisoprene, poly(styrene-co-butadiene), polydimethysiloxane or silicone rubber, natural latex rubber, and combinations thereof.

In the rubber composite, the effective amount of pristine nano graphene platelets is between 0.01 and 60 weight percent based on the total weight of the rubber composite, but preferably between 0.01% and 30%, and most preferably between 0.1% and 5%. The NGPs can have a length or width up to 10 μm (or even higher), but typically between 0.3 μm and 3 μm. With a thickness as small as 0.335 nm, the NGPs typically and preferably have a length-to-thickness aspect ratio of approximately between 1,000 and 10,000.

Another preferred embodiment of the present invention is a tire, comprising a rubber composite. The rubber or elastomer composite comprises: (a) one rubber or elastomer matrix with a first thermal conductivity; and (b) an effective amount of oxidized nano graphene platelets dispersed in the matrix to make the rubber matrix composite thermally conducting, having a thermal conductivity greater than the first thermal conductivity of the matrix. The oxidized nano graphene platelets are produced by one of the following two processes: (A) production of pristine graphene (e.g., by direct ultrasonication), followed by oxidation of pristine graphene (e.g., through exposure to weak acid or high temperature air); or (B) production of graphite oxide nano platelets (e.g., through chemical oxidation and ultrasonication-assisted exfoliation), followed by chemical or thermal reduction of the graphite oxide nano platelets. Thermal reduction may be accomplished by exposing the GO platelets to a high-temperature (e.g., 800-1,100° C. for 10-30 minutes), but inert gas or nitrogen environment. Chemical reduction can be conducted by reacting GO platelets with a reducing agent (e.g., $NaBH_4$ or hydrazine).

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-scaled. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure." These graphitic materials are regarded as three-dimensional entities. Through pulverizing and milling, these graphite particles may be size-reduced to sub-micron or slightly less than 500 nm in diameter and they are referred to as graphite nano particles.

Over the last two decades, two types of carbon allotropes were discovered: the zero-dimensional fullerene and one-dimensional carbon nanotube (CNT), which have significantly advanced the field of nano materials and nanotechnology. In most recent years, a new class of carbon-based material was developed—the nano graphene platelet (NGP). NGP may be considered a two-dimensional carbon material. An NGP is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each platelet has a length and a width parallel to the graphite plane and a thickness orthogonal to the graphite plane. The thickness of an NGP, by definition, is 100 nanometers (nm) or smaller, but typically thinner than 10 nm with a single-sheet NGP being as thin as 0.34 nm. The length and width of a NGP are typically between 0.5 μm and 20 μm, but could be longer or shorter.

NGPs have been shown to exhibit the highest intrinsic strength and highest thermal conductivity of all materials ever studied by scientists. NGPs also have exceptional elastic modulus (approximately 1 TPa or 1,000 GPa) and high electrical conductivity (up to 20,000 S/cm). NGPs, if incorporated as fillers in a composite material, are expected to impart outstanding properties to the matrix material.

There are several unique features of NGPs that make them an ideal candidate for a rubber additive:
  (1) For tire or tire component applications, the ultra-high thermal conductivity of NGPs is of particular interest since, in most of the ground vehicle moving situations, heat is continuously produced and, hence, fast heat dissipation is an important requirement. For this purpose, pristine NGPs have much higher thermal conductivity compared to graphite oxide nano platelets.
(2) The ultra-high strength of NGPs can provide superior wear resistance to a rubber matrix. Further, certain portion of a tire requires a high stiffness, which can be imparted by NGPs having ultra-high elastic modulus.
(3) Furthermore, a graphene plane is a structure of extended carbon hexagons or an extended fused-ring aromatic structure, which is more thermally and chemically stable than most of the organic molecules. This implies that graphene is more capable of providing long-term, stable protection against chemical attack.
(4) The unique plate-like geometry enables NGPs to slide over one another, providing stable fluid properties during rubber processing (e.g., viscosity remains relatively stable with respect to the variations in shear rate). This same geometry also enables a large proportion of NGPs (e.g., up to 75% by weight) to be dispersed in a rubber matrix. This is in sharp contrast to the observation that one normally could not disperse more than 10% by weight (typically <5%) of CNTs in a polymer.
(5) The same plate-like geometry, which is impermeable to gas or liquid molecules, also imparts outstanding barrier properties to a rubbery material (e.g., for tire lining).
The tremendous application potential has been largely overlooked in industry. After some diligent research and development efforts on NGPs as a modifier for tire rubber, the applicant has discovered many surprising results.

In one preferred embodiment, the present invention provides a tire or tire component (e.g., tire lining) that has a significantly improved thermal conductivity. The tire or tire component comprises a rubber composite, comprising at least one rubber or elastomer matrix with a first thermal conductivity and an effective amount of pristine nano graphene platelets dispersed in the matrix to make the rubber matrix composite thermally conductive, having a thermal conductivity greater than the first thermal conductivity of the matrix.

Rubbers or elastomers that can be compounded with nano graphene platelets include, but are not limited to, poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone], poly [4,4'-methylenebis(phenyl isocyanate)-alt-1,4-butanediol/polytetrahydrofuran], amine terminated polybutadiene (e.g. HYCAR ATB2000×173), carboxyl terminated polybutadiene (e.g. HYCAR CTB2000×162), polybutadiene, dicarboxy terminated butyl rubber, styrene/butadiene copolymers, polyisoprene, poly(styrene-co-butadiene), polydimethysiloxane or silicone rubber, and natural latex rubber. NGP-modified rubber composites can be used in a tire component (e.g. tire lining).

The ultra-high thermal conductivity of NGPs effectively converts a rubber (typically of low thermal conductivity) into a material that can conduct heat efficiently. A small amount of NGPs can dramatically increase the thermal conductivity of a rubber matrix. For instance, the applicant observed that with as low as 0.01% by weight of mostly single-layer pristine graphene incorporated in natural rubber, the thermal conductivity could be increased by almost 500%. This is a highly unexpected result.

The preferred amount of NGPs in the rubber composite is 0.01 to 60%, more preferably 0.1 to 30%, further preferably 1-15% by weight based on the total weight of the composite. With these added NGPs, the thermal conductivity of the resulting rubber composite typically is increased from a range of approximately 0.12-0.20 W/m–K (for a neat rubber) to a range of 0.5-500 W/m–K. The extent of enhancement, as high as 4000 times, is absolutely unprecedented. Carbon blacks, with thermal conductivity of approximately 1 W/m–K, could not significantly improve the thermal conductivity of a rubber.

Currently, carbon blacks or silica are added to elastomers to impart desirable mechanical properties. These fillers create a modulus that increases with strain. This non-linearity protects rubber from damage during large deformations. The NGPs, pristine or slightly oxidized, could provide similar enhanced non-linear strain hardening to elastomers. The interface is similar to that of carbon black, but the flexibility of the NGPs enables deformation at low strains and hardening at higher deformations. The NGPs are superior to clay nano-platelets that have been considered for these applications for two reasons: (1) the carbon structure of NGPs has better interfacial compatibility with rubber matrices than do inorganic clay platelets, and (2) the greater flexibility of the graphene sheet, compared to clays, decreases interfacial fatigue and debonding. Again, polymers that can be compounded to produce elastomers with enhanced modulus and toughness include, but are not limited to, poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone]; poly [4,4'-methylenebis(phenyl isocyanate)-alt-1,4-butanediol/polytetrahydrofuran], amine terminated polybutadiene, carboxyl terminated polybutadiene, butyl rubber, polybutadiene, dicarboxy terminated styrene/butadiene copolymers, polyisoprene, poly(styrene-co-butadiene), polydimethysiloxane, and natural latex rubber.

Butyl rubber is known to have excellent gas diffusion barrier properties and is, therefore, used as the lining for tubeless tires and for inner tubes. However it is significantly more expensive than other elastomers. Rubbers and elastomers that are used in tire applications do not have sufficient gas diffusion barrier properties to function in tire applications without the butyl rubber lining layer. The plate-like geometry of NGPs with a length or width typically in the range of 0.3-10 μm and a thickness as low as 0.34 nm can provide excellent barrier properties when added to conventional rubbers and elastomers and oriented perpendicular to the direction of gas diffusion. Barrier properties of up to 1,000 times greater than that of the unfilled rubber are possible.

Elastomers that can be compounded to produce materials with enhanced barrier properties include, but are not limited to, poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone], poly[4,4'-methylenebis(phenyl isocyanate)-alt-1,4-butanediol/polytetrahydrofuran], amine terminated polybutadiene, carboxyl terminated polybutadiene, butyl rubber, polybutadiene, dicarboxy terminated styrene/butadiene copolymers, polyisoprene, poly(styrene-co-butadiene), polydimethysiloxane, and natural latex rubber. Even butyl rubbers can significantly benefit from NGPs that can dramatically increase the rubbers' permeation resistance.

Thinner NGPs usually result in a much higher thermal conductivity for a rubber. Thus, in one preferred embodiment, the nano graphene platelets have an average thickness less than 10 nm or a specific surface area greater than 90 $m^2/g$ (as measured by the well-known BET method). Further preferably, the nano graphene platelets have an average thickness less than 1 nm or a specific surface area greater than 900 $m^2/g$. Most preferably, the pristine graphene platelets comprise a significant proportion of single-layer graphene. The pristine nano graphene platelets can be cost-effectively produced in large quantities by direct ultrasonication.

It was also surprising for the applicant to observe that graphite oxide nano platelets, if chemically or thermally reduced to remove a majority of the oxygen content therefrom, could impart better thermal conductivity to a rubber matrix without sacrificing other characteristics, such as dispersibility in a rubber resin, interfacial adhesion with the rubber matrix, strength, stiffness, barrier property, and abrasion resistance. Actually, the strength, stiffness, barrier property (permeation resistance), and abrasion resistance (against wear and tear) were further increased with the addition of NGPs. The pristine graphene can be slightly oxidized using chemical oxidation (e.g., through exposure to a weak oxidizing agent such as dilute hydrogen peroxide, citric acid, and sulfonic acid) or exposure to high temperature air for a short period of time. Although not critically required, slight oxidation of pristine graphene improves the dispersion of NGPs in more polar rubber chains, without compromising other desirable properties.

The following examples serve to provide the best modes of practice for the present invention, and should not be construed as limiting the scope of the invention:

EXAMPLE 1

Pristine Nano-Scaled Graphene Platelets (NGPs) Prepared by Direct Ultrasonication of Natural Graphite Particles Five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction for a period of 2 hours. The resulting suspension contains a huge number of ultra-thin graphene sheets floating in water. These nano graphene sheets were collected by spray-drying. TEM examination of the dried NGPs indicates that most of these NGPs had 1-5 graphene layers.

Pristine NGPs with a different average thickness were obtained by using different sonic energy levels and lengths of time. Some amount of pristine NGPs was then submitted to a high-temperature (900° C.) oxidation treatment in air for 5-30 minutes. The resulting NGPs have a C/O atomic ratio of from approximately 96/4 to 87/13 based on an X-ray photoelectron spectroscopy (XPS) study.

EXAMPLE 2

Exfoliation and Separation of Graphite Oxide

Graphite oxide was prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å).

Graphite oxide was then inserted into a quartz tube at a temperature of 900° C. for 60 seconds under a flowing nitrogen condition to obtain exfoliated graphite oxide. The exfoliated graphite oxide was then ultrasonicated in water (no surfactant) for 15 minutes to obtain graphene oxide platelets.

Approximately 50% of the GO nano platelets obtained were then subjected to a thermal reduction treatment by exposing these platelets to an argon gas environment at 1,000° C. for 30 minutes. During this treatment, certain amounts of oxygen escaped from the sample in the form of carbon dioxide. Fourier transform infrared spectroscopy (FTIR), XPS, and TGA were used to identify the functional groups and estimate the amounts of these groups. Typically, the C/O atomic ratio in thermally exfoliated GO platelets was less than 85/15, and often close to 70/30. Upon chemical or thermal reduction, the C/O ratio became >85/15 and could become >95/5.

EXAMPLE 3

Graphite Nanoparticles Prepared from Natural Graphite

Natural graphite particles approximately 10 µm in size, along with small stainless steel balls, were sealed in two chambers of a high-energy ball mill. Ball milling was allowed to proceed with a small amount of graphite particles being sampled out every 12 hours or so to monitor the particle size. After approximately 96 hours, the average graphite particle size was found to be approximately 380 nm. Approximately 120 grams of graphite nanoparticles were prepared.

EXAMPLE 4

Thermal Conductivities of Various Modified Rubber Compositions

In order to compare and contrast the thermal conductivity of various rubber composite compositions, four different carbon nano materials (NGPs, slightly oxidized NGPs, heavily oxidized NGPs or GO nano platelets, and graphite nanoparticles) were incorporated into the same rubber. The rubber composite was prepared by mixing nano carbon material (NGPs, GO, or GN particles), and a base rubber resin together according to the proportions specified in he table below. The mixture was then sonicated using Digital Sonifier Model 405C by Branson Ultrasonics Corporation (Monroe Township, N.J.). The sonication was carried out at a low power level (<60 watts) intermittently at room temperature for 15 to 30 min, to avoid damaging and altering the structures of graphite nanoparticles, graphene or graphene oxide platelets. Typically, the carbon nanoparticle-containing suspension (cooled by an ice-water mixture bath) was energized for 1-2 min with a break about 5 min in between. The rubber resin was then cured or vulcanized. The thermal conductivity data for the rubber composites are shown in Table 1 and plotted in FIGS. 3-5.

TABLE 1

Thermal conductivity data of NGP- or GO-modified rubbers.

| Wt. % | Pristine NGP, <0.8 nm | Pristine NGP, <6 nm | Graphite oxide, <6 nm | Graphite nano particles, 350 nm | Reduced Graphite oxide, <6 nm |
|---|---|---|---|---|---|
| 0.01 | 0.66 | 0.185 | 0.145 | 0.141 | 0.16 |
| 0.1 | 5.41 | 0.635 | 0.235 | 0.195 | 0.33 |
| 1 | 10.7 | 1.11 | 0.834 | 0.553 | 0.93 |
| 2 | 21.3 | 2.11 | 1.33 | 0.852 | 1.83 |
| 5 | 53.1 | 5.10 | 2.60 | 1.60 | 3.42 |
| 10 | 106 | 10.1 | 4.10 | 2.49 | 6.78 |
| 20 | 212 | 20.1 | 6.08 | 3.69 | 9.8 |
| 30 | 318 | 30.1 | 7.57 | 4.57 | 14.5 |
| 40 | 424 | 40.1 | 8.06 | 4.86 | 17.4 |
| 50 | 530 | 50.0 | 10.0 | 6.05 | 22.3 |

Figure 3:
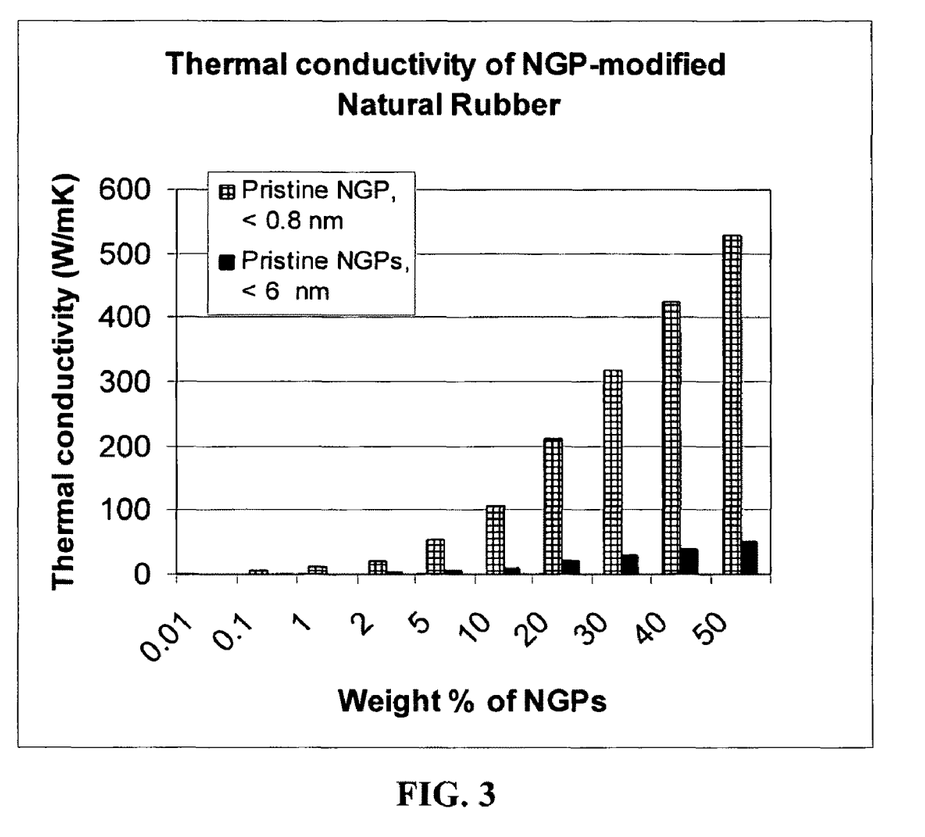
FIG. 3 Thermal conductivity data of natural rubber modified by pristine NGPs of two different sizes; thinner NGPs imparting higher thermal conductivity to the rubber matrix.

FIG. 3 demonstrates that the graphene platelet thickness has a major effect on the thermal conductivity of NGPs and NGP-rubber composites. Thin pristine NGPs, mostly single-layer graphene (e.g., average thickness <0.8 nm) could dramatically increase the thermal conductivity of natural rubber from approximately 0.13 W/m–K to 0.66 W/m–K (with only 0.01% NGPs added) and to as high as 530 W/m–K (with 50% NGPs), an increase by >4,000 times. This is an astonishing result to even a person of extraordinary ability in the art.

Figure 4:
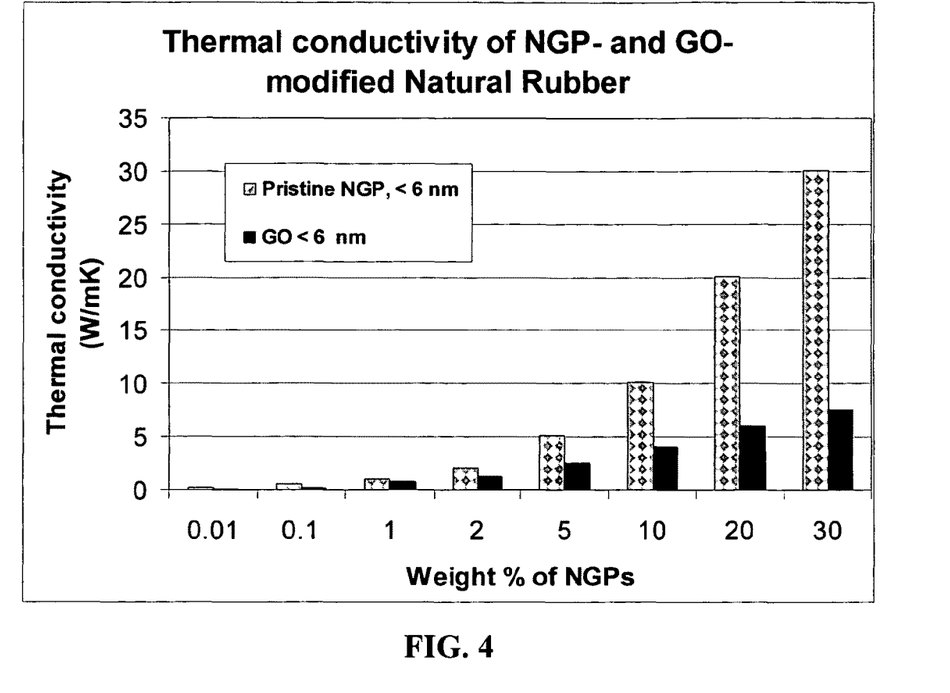
FIG. 4 Thermal conductivity data of natural rubber modified by pristine NGPs and graphite oxide (GO) nano platelets. The pristine NGPs were prepared by direct ultrasonication and the GP nano platelets were produced by thermal exfoliation of chemically intercalated and oxidized graphite.
Figure 5:
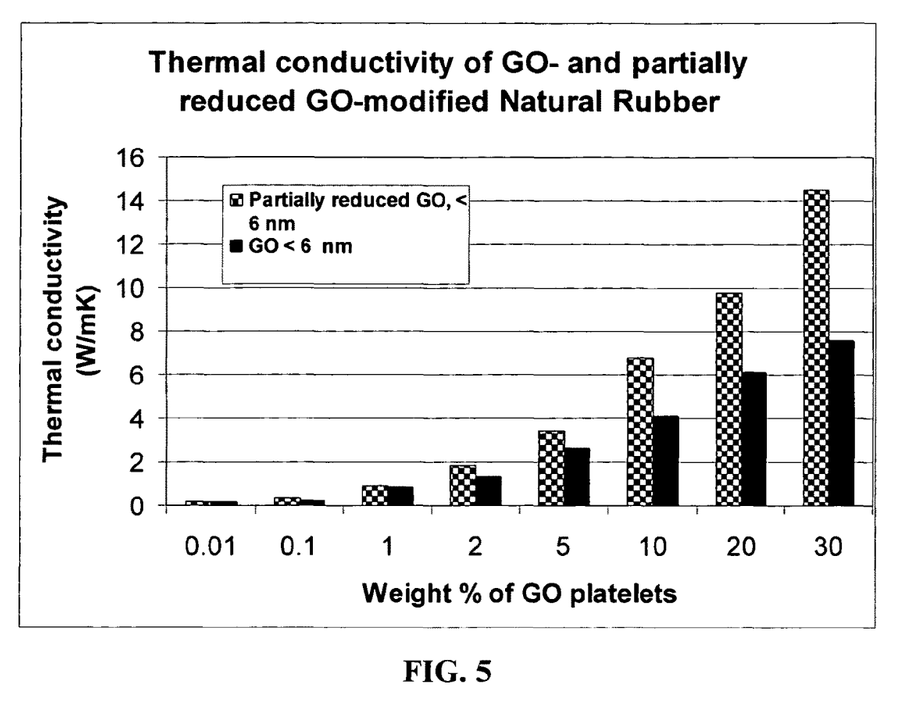
FIG. 5 Thermal conductivity data of natural rubber modified by partially reduced graphite oxide (GO) nano platelets and un-reduced GO nano platelets.

FIG. 4 indicates that pristine NGPs are much more effective than their GO counterparts in enhancing the thermal conductivity of a rubber matrix. Given the same weight fraction, the thermal conductivity of pristine NGP-modified rubber is always significantly higher than that of the graphite oxide nano particle-modified version. FIG. 5 indicates that the thermally reduced GO nano platelets are much more effective than their un-reduced GO counterparts in enhancing the thermal conductivity of a rubber matrix.

A comparison of Columns 3-5 of Table 1 shows that both pristine NGPs and GO nano platelets are superior to the conventional graphite nano particles (prepared by pulverizing and ball milling of natural graphite) in terms of their ability in significantly enhancing the thermal conductivity of a rubber matrix. These observations further validate the commonly accepted notion that NGPs (including both pristine graphene and GO nano platelets) are a fundamentally different and patently distinct class of nano materials than graphite nano particles.

In conclusion, the presently invented pristine NGP-modified rubber compositions for tire applications exhibit superior thermal characteristics as compared with corresponding compositions containing either graphite nano particles or graphite oxide (GO) nano platelets. For instance, some of the thermal conductivity values of NGP-containing rubbers are the highest ever reported for rubbery or elastomeric materials. These highly surprising results could not be and have not been achieved with carbon nanotubes, graphite nano particles, carbon black, or GO nano platelets (e.g., those produced by thermal exfoliation of heavily oxidized graphite). No prior art has taught about the pristine NGP-containing rubber composition or the partially reduced GO-containing rubber composition.

The invention claimed is:

1. A tire comprising a rubber composite, comprising at least one rubber or elastomer matrix with a first thermal conductivity and an effective amount of pristine nano graphene platelets dispersed in said matrix to make said rubber matrix composite thermally conducting, having a thermal conductivity greater than said first thermal conductivity of the matrix.

2. The tire of claim 1, wherein the pristine graphene platelets comprise single-layer graphene.

3. The tire of claim 1, wherein the nano graphene platelets have an average thickness less than 10 nm or a specific surface area greater than 90 $m^2/g$.

4. The tire of claim 1, wherein the nano graphene platelets have an average thickness less than 1 nm or a specific surface area greater than 900 $m^2/g$.

5. The tire of claim 1, wherein the nano graphene platelets are produced by direct ultrasonication.

6. The tire of claim 1, wherein the pristine graphene platelets have a thermal conductivity greater than 1,000 W/m-k.

7. The tire of claim 1, wherein the pristine graphene platelets have a thermal conductivity greater than 3,000 W/m-k.

8. The tire of claim 1, wherein the rubber composite has a thermal conductivity greater than 1 W/m-k.

9. The tire of claim 1, wherein the rubber composite has a thermal conductivity greater than 10 W/m-k.

10. The tire of claim 1, wherein the rubber composite has a thermal conductivity greater than 100 W/m-k.

11. The tire of claim 1, wherein the rubber or elastomer is selected from the group consisting of poly[4,4'-methylenebis (phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis (phenyl isocyanate)-alt-1,4-butanediol/di(propylene glycol)/ polycaprolactone], poly[4,4'-methylenebis(phenyl isocyanate)-alt-1,4-butanediol/polytetrahydrofuran], amine terminated polybutadienes, carboxyl terminated polybutadienes, polybutadiene, dicarboxy terminated butyl rubber, styrene/butadiene copolymers, polyisoprene, poly(styrene-co-butadiene), polydimethylsiloxane, natural latex rubber, and combinations thereof.

12. The tire of claim 1, wherein the effective amount of pristine nano graphene platelets is between 0.01 and 30 weight percent based on the total weight of the rubber composite.

13. The tire of claim 1, wherein the effective amount of pristine nano graphene platelets is between 0.1 and 5 weight percent based on the total weight of the rubber composite.

14. The tire of claim 1, wherein the pristine nano graphite platelets have a length-to-thickness aspect ratio of between 1000 and 10,000.

* * * * *